United States Patent

Krauter et al.

[11] Patent Number: 5,639,061
[45] Date of Patent: Jun. 17, 1997

[54] SOLENOID VALVE IN A HYDRAULIC BRAKE SYSTEM FOR MOTOR VEHICLES

[75] Inventors: Michael Krauter; Alexander Bareiss, both of Charleston, S.C.

[73] Assignee: Robert Bosch GmbH, Stuttgart, Germany

[21] Appl. No.: 568,446

[22] Filed: Dec. 7, 1995

[30] Foreign Application Priority Data

Mar. 29, 1995 [DE] Germany .................. 195 11 455.8

[51] Int. Cl.$^6$ .................................................. F16K 31/06
[52] U.S. Cl. .................. 251/77; 251/129.19; 303/116.2; 303/119.2
[58] Field of Search ........................ 251/77, 129.19; 303/116.2, 119.2

[56] References Cited

U.S. PATENT DOCUMENTS

| | | | |
|---|---|---|---|
| 2,121,657 | 6/1938 | Fisher | 251/129.19 X |
| 3,970,282 | 7/1976 | Hansen | 251/129.19 X |
| 4,008,876 | 2/1977 | Bastle | 251/129.19 |
| 5,335,981 | 8/1994 | Volz et al. | 303/116.2 X |

FOREIGN PATENT DOCUMENTS

| | | |
|---|---|---|
| 4041506 | 6/1992 | Germany . |
| 4236505 | 5/1994 | Germany . |
| 92/04214 | 3/1992 | WIPO . |
| 93/15941 | 8/1993 | WIPO . |
| 94/08831 | 4/1994 | WIPO . |

*Primary Examiner*—Gerald A. Michalsky
*Attorney, Agent, or Firm*—Edwin E. Greigg; Ronald E. Greigg

[57] ABSTRACT

A solenoid valve which guarantees the reliable opening of the valve, even when there are great pressure differences. The solenoid valve has an armature which receives a tappet, that can be longitudinally moved in the solenoid valve. A restoring spring, which transports the armature with the tappet into a closed position of the solenoid valve, engages one side of a collar of the tappet and a compression spring, which acts in the opposite direction from this restoring spring and is supported on the armature. The compression spring has a greater initial stress than the restoring spring. Pressure drops can produce a hydraulic closing force on the tappet, which force is directed counter to the magnetic force action. When the solenoid valve is switched over into the open position, the armature therefore executes a partial stroke (h) counter to the action of the compression spring before the armature carries the tappet along with it by means of engaging the collar, as a result of the magnetic force, which increases with the increasing armature stroke (H). The solenoid valve can be employed in a suction line between a master cylinder and a regenerative high pressure pump of a hydraulic brake system for motor vehicles.

4 Claims, 1 Drawing Sheet

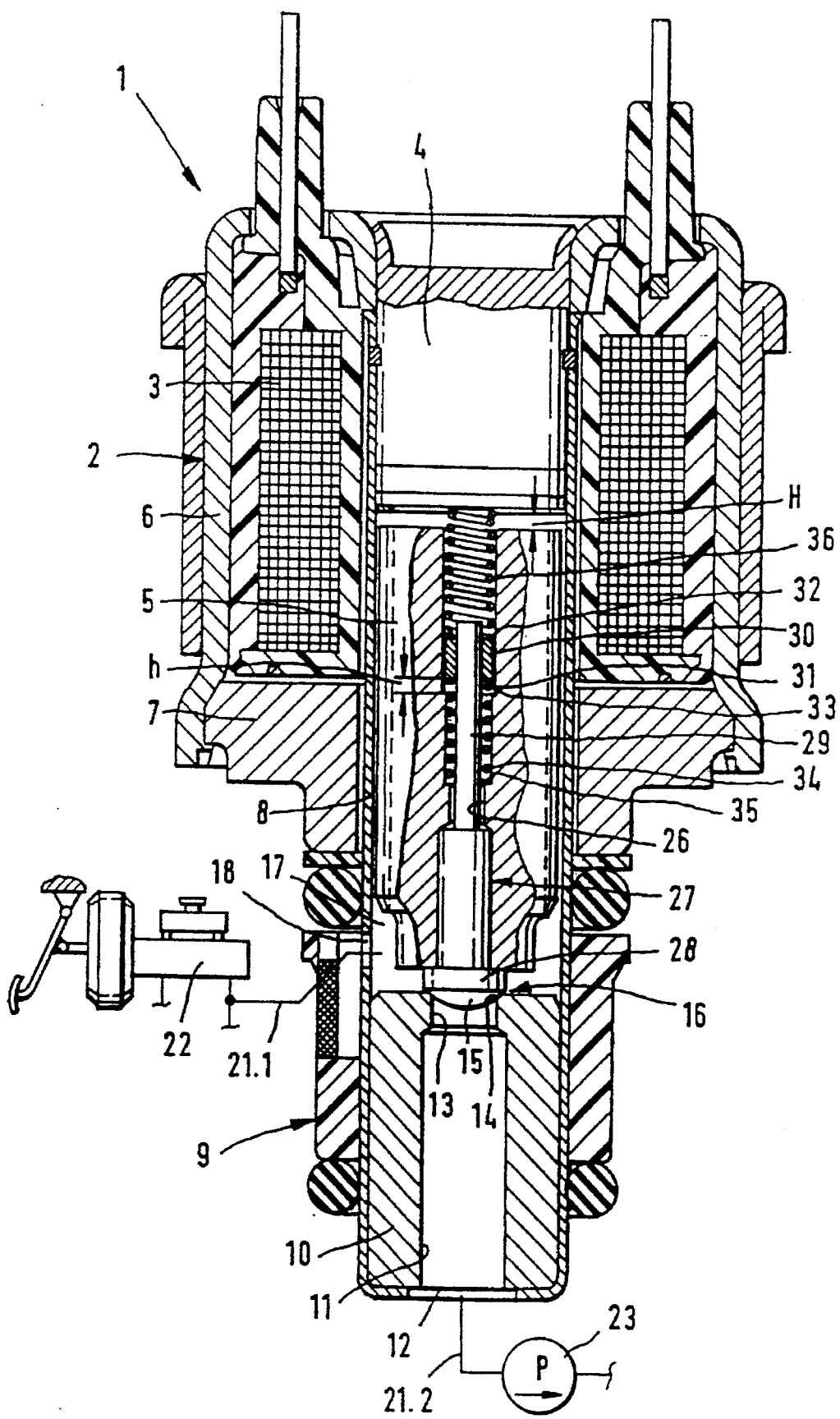

# SOLENOID VALVE IN A HYDRAULIC BRAKE SYSTEM FOR MOTOR VEHICLES

BACKGROUND OF THE INVENTION

The invention is based on a solenoid valve in a hydraulic brake system for motor vehicles.

A solenoid valve of this kind is disclosed in the technical manual *Bremsanlagen für Kraftfahrzeuge/Bosch* [Brake Systems for Motor Vehicles/Bosch] 1st edition, Düsseldorf: VDI-Verlag, 1994, pp. 69, 70 (FIG. 8c). It is used in a slip regulated hydraulic brake system (FIG. 10) for motor vehicles, in actuality as an intake valve in a suction line of a regenerative high pressure pump which produces the braking pressure in the case of a drive slip regulation. This known solenoid valve is distinguished by a relatively large opening cross section, so that even at low temperatures, the high pressure pump can draw off pressure fluid fast enough from the master cylinder.

In the future, modern motor vehicles will be equipped with brake systems (for example according to German Patent Application P 44 41 791.8, FIG. 4) also for automatic braking with which, for example depending upon vehicle behavior, the traffic situation, or obstacles appearing in the path of the vehicle, the brake system activates—even independent of the driver—and brake pressure is built up and modulated in the above-mentioned manner. If the vehicle is already in a braking operation tripped by the driver, then the solenoid valve in the suction line has to open counter to the pressure produced by the master cylinder. The magnetic circuit of the valve could be correspondingly dimensioned in order to produce the opening forces required. This is undesirable, though, because it makes the solenoid valve larger, heavier, and more expensive.

OBJECT AND SUMMARY OF THE INVENTION

The brake valve according to the invention, as defined by the body of the main claim, has the advantage over the prior art that when pressure is generated by the master cylinder, the magnetic force, which is low at the beginning of the opening stroke of the armature, is used in order to move the pressure balanced armature only counter to the force of the compression spring, but to leave the tappet, which is not pressure balanced and is loaded by a hydraulic closing force, in its position which closes the valve until after a partial stroke of the armature and in this way, when there is a higher magnetic force, the tappet is carried along by the armature and the valve is opened. Since the tappet is now likewise pressure balanced, the compression spring, which is stronger than the restoring spring, can pull the tappet back into the armature. It is consequently possible, without enlarging the magnetic part of the valve, to provide a relatively large opening cross section, in spite of pressure on the master cylinder side in the suction line. When the master cylinder is not actuated, however, the tappet is transferred at the same time as the armature into the open position of the valve.

By means of the measures recited herein, advantageous further embodiments and improvements are possible, which aid in the economical production of the solenoid valve and keep its structural volume low.

The invention will be better understood and further objects and advantages thereof will become more apparent from the ensuing detailed description of preferred embodiments taken in conjunction with the drawings.

BRIEF DESCRIPTION OF THE DRAWINGS

An exemplary embodiment of the invention is shown in a simplified manner in the drawing, in a longitudinal section through a solenoid valve, and is explained in detail in the description below.

DESCRIPTION OF THE PREFERRED EMBODIMENTS

A solenoid valve 1, which is shown in longitudinal section in the drawing, is intended for use in a hydraulic brake system for motor vehicles. The solenoid valve 1 has a magnetic part 2 comprising a magnet coil 3, a pole core 4, an armature 5, and a housing jacket 6 that encompasses the magnet coil 3 and is connected with a yoke part 7 remote from the pole core. A guide sleeve 8 for the armature 5, which sleeve reaches through the yoke part 7, is welded to the pole core 4 in a pressure fluid sealing manner on the pole core upper end. A press-fitted valve body 10, which is affiliated with a hydraulic part 9 of the solenoid valve 1, is disposed in the armature guide sleeve 8 remote from the pole core. This valve body 10 has a through bore 11, which communicates on one end with an outlet opening 12 of the armature guide sleeve 8; on the other end, the through bore opens into a valve seat 14 downstream of a valve opening 13. A dome-shaped, closing member 15 of a seat valve 16 cooperates with the valve seat 14. A valve chamber 17 is embodied in the armature guide sleeve 8 on the closing member end, and has an inlet opening 18 for pressure fluid.

The solenoid valve 1 is disposed in the course of a suction line 21, which comes from a pedal-actuatable master cylinder 22 and leads to the suction side of a regenerative high pressure pump 23. A part 21.1 of the suction line 21 on the master cylinder side communicates with the inlet opening 18, while a line part 21.2 on the pump side communicates with the outlet opening 12 of the armature guide sleeve 8.

The closing member 15 of the seat valve 16 is embodied on a longitudinally movable tappet 27 received in a longitudinal bore 26 of the armature 5. On its seat valve end, the tappet 27 has a head 28, which is large in diameter, and on which the dome of the closing member 15 is disposed, and on its end remote from the seat valve, it has a shaft 29, which is small in diameter and extends entirely within the longitudinal bore 26. A sleeve 30 is pressed onto the shaft 29. In the course of the shaft 29, this sleeve forms a collar with a face end 31 oriented toward the closing member and a face end 32 oriented away from the closing member. The face end 31 oriented toward the closing member is associated with a step 33, which narrows the diameter of the longitudinal bore 26 in the space h, which is indicated as the partial stroke of the armature. A compression spring 34, which is longitudinally guided on the shaft 29 of the tappet 27, engages the face end 31 oriented toward the closing member and on its end oriented away from the sleeve, is supported on a second step 35, which further reduces the diameter of the longitudinal bore 26. A restoring spring 36 of the solenoid valve 1, which spring is likewise embodied as a compression spring, is received in the pole core end of the longitudinal bore 26. On one end, this restoring spring engages the face end 32 of the sleeve 30 oriented away from the closing member, and on the other end, it is supported on the pole core 4. The compression spring 34 has a greater initial stress than the restoring spring 36. In the solenoid valve 1 position of repose shown, therefore, the head 28 of the tappet 27 is supported on the armature 5 and the face end 31 of the sleeve 30 oriented toward the closing member assumes the already explained spacing h from the step 33 of the longitudinal bore 26. With the action of the restoring spring 36, the closing member 15 of the seat valve 16 engages the valve seat 14 of the valve body 10 and severs the pressure fluid conducting connection between the master cylinder 22 and the suction side of the high pressure pump 23. In this position, the armature 5 assumes a spacing with regard to the pole core 4 that is designated as the armature stroke H.

The solenoid valve 1 functions in the following manner:

A magnetic field is produced by supplying power to the magnet coil 3 and by means of this, produces a dynamic effect on the armature 5 in the direction of the pole core 4. When the master cylinder 22 is not actuated, there are essentially no pressure differences between the two parts 21.1 and 21.2 of the suction line 21, so that the armature 5, which is bathed in pressure fluid, is pressure balanced including its closing member 15. The armature 5 and the tappet 27 are therefore pulled toward the pole core 4, overcoming the armature stroke H. The tappet 27 executes no relative movement with regard to the armature 5 because the initial stress and the stiffness of the compression spring 34 are greater than those of the restoring spring 36.

However, if the master cylinder 22 is actuated, then a considerable pressure drop can prevail between the master cylinder side part 21.1 and the pump side part 21.2 of the suction line 21. The armature 5 is subjected to the pressure on the master cylinder side; in comparison, the face of the closing member 15 on the tappet 27, which face is oriented toward the valve opening 13, is to a large degree unpressurized. Thus while the armature 5 is pressure balanced even under these conditions, this is not the case for the tappet 27. The tappet 27 is therefore subjected to a hydraulic closing force directed toward the valve seat 14. If the hydraulic closing force and the initial stress force of the restoring spring 36 outweigh the initial stress force of the compression spring 34 and the magnetic force exerted on the armature 5 when the magnet coil 3 is excited, then the closing member 15 adheres for the time being to the valve seat 14 during the movement of the armature 5 toward the pole core 4. Consequently a relative motion of the armature 5 in relation to the tappet 27 occurs. After the partial armature stroke h is overcome, though, the step 33 of the longitudinal bore 26 of the armature 5 strikes the face end 31 of the sleeve 30 on the tappet shaft 29, which face end is oriented toward the closing member. Since the magnetic force has considerably increased as a result of the approach of the armature 5 to the pole core 4, this force, in cooperation with the force exerted on the tappet 27 by the compression spring 34, is now able to overcome the equally acting hydraulic closing force on the tappet 27 and to lift the closing member 15 up from the valve seat 14. While the armature 5 travels the remaining part of the armature stroke H, the pressure drop between the valve chamber 17 and the through bore 11 of the valve body 10 begins to balance out. The hydraulic closing force on the tappet 27 is thus discontinued, so that the energy stored in the compression spring 34 transports the tappet 27 into a position in which, as shown, the face end 31 of the sleeve 30 oriented toward the closing member assumes the spacing h from the step 33 of the longitudinal bore 26, and the head 28 of the tappet 27 is supported on the armature 5. Consequently, in the open position of the solenoid valve 1, the closing member 15 assumes a spacing from the valve seat 14 which corresponds to the armature stroke H. The solenoid valve 14 now unblocks its entire opening cross section.

When the supply of current to the magnet coil 3 ends, the magnetic force stops, and with the action of the restoring spring 36, the armature 5 returns to its shown position, in which the closing member 15 of the tappet 27 rests on the valve seat 14 and closes the seat valve 16.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A solenoid valve (1) in a suction line (21) of a brake system for motor vehicles, said suction line extends between a master cylinder (22) and a suction side of a high pressure pump (23), said solenoid valve has the following features:

a closing member (15), which is acted upon by a prestressed restoring spring (36), that engages a valve seat (14) which encompasses a valve opening (13), the closing member (15) is associated with a first line part (21.1) of the suction line (21) on a master cylinder side, and the valve seat (14) is associated with a second line part (21.2) on a pump side, the closing member (15) can be lifted up from the valve seat (14) by an exertion of a magnetic force on an armature (5), said armature is displaceable counter to a force of the restoring spring (36) and is received in a valve chamber (17) that communicates with the first line part (21.1) of the suction line (21) on the master cylinder side, the closing member (15) is disposed on a tappet (27), the tappet (27) is received in a continuous longitudinal bore (26) of the armature (5) in such a manner that the tappet can move longitudinally relative to said armature, a relative longitudinal motion of the tappet (27) is limited to a stroke (h), which is smaller than an armature stroke (H), said tappet (27) has a head (28), with a closing member (15), said head is larger in diameter than the tappet and is supported on the armature (5), said tappet has a shaft (29), which is smaller in diameter than said head and extends in the longitudinal bore (26) of the armature (5), said shaft has a collar (30) with a first face end (31) oriented toward the closing member said face end is engaged by a compression spring (34) and a second face end (32) is oriented away from the closing member and said second face end is engaged by the restoring spring (36), an end of the restoring spring (36) remote from the closing member, engages the tappet (27) at least indirectly, said compression spring (34) counteracts an action of the restoring spring (36) and is supported on the armature (5), said compression spring engages the tappet (27) at least indirectly, the longitudinal bore (26) of the armature (5) has a step (33), said step cooperates with the first face end (31) of the collar (30) oriented toward the closing member and limits the longitudinal movement of the tappet (27), and an initial stress of the compression spring (34) is greater than that of the restoring spring (36).

2. The solenoid valve according to claim 1, in which the collar is embodied by a sleeve (30) pressed onto the shaft (29) of the tappet (27).

3. The solenoid valve according to claim 2, in which the compression spring (34) is longitudinally guided on the shaft (29) of the tappet (27).

4. The solenoid valve according to claim 1, in which the compression spring (34) is longitudinally guided on the shaft (29) of the tappet (27).

* * * * *